(No Model.)
R. SOLANO.
VACUUM MOTOR.
No. 349,758. Patented Sept. 28, 1886.
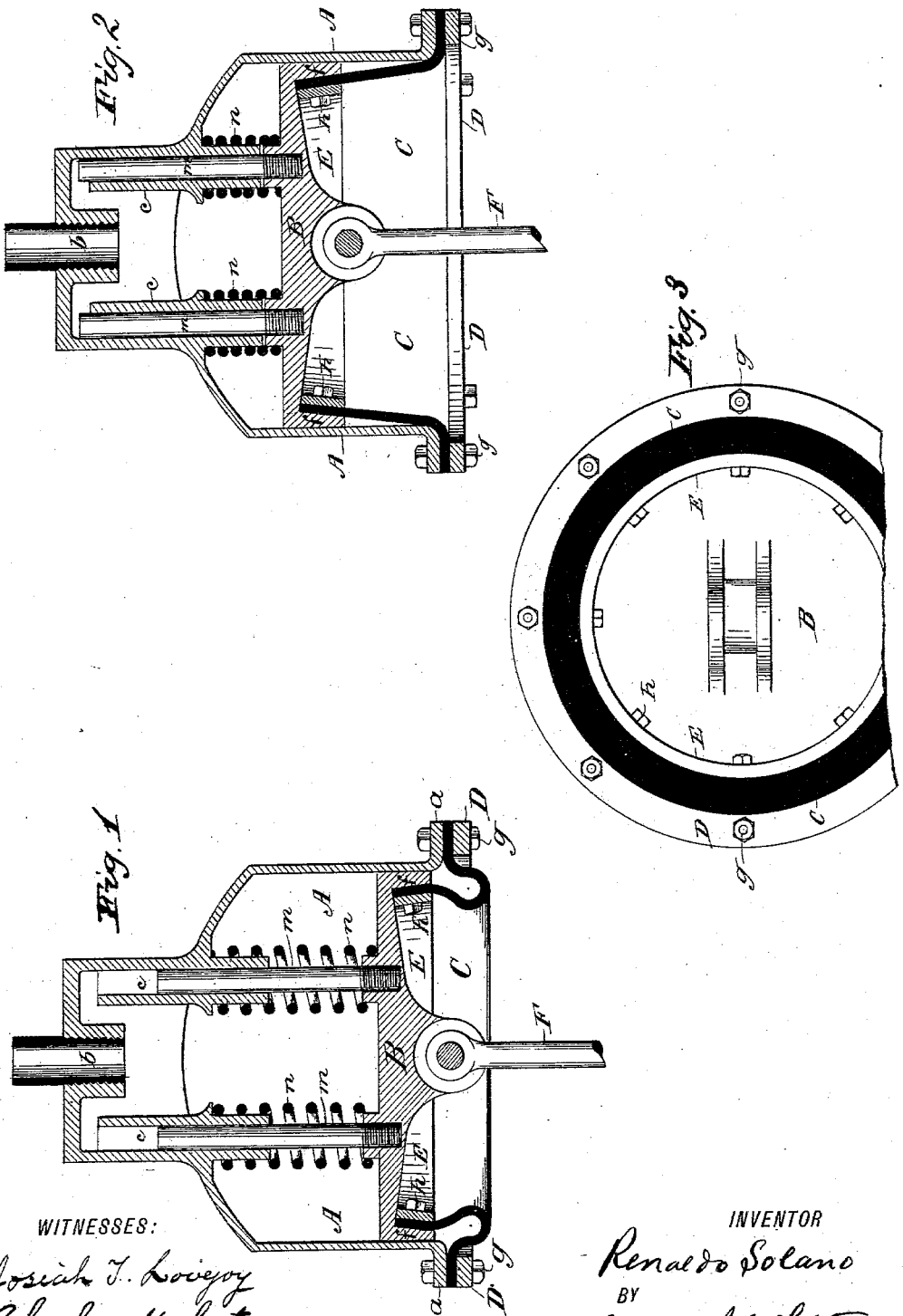
WITNESSES:
Josiah T. Lovejoy
Charles Herbert
INVENTOR
Renaldo Solano
BY James A. Whitney
ATTORNEY

UNITED STATES PATENT OFFICE.

RENALDO SOLANO, OF BROOKLYN, NEW YORK, ASSIGNOR OF TWO-THIRDS TO JOHN W. HOWARD AND DAVID R. MORSE, BOTH OF SAME PLACE.

VACUUM-MOTOR.

SPECIFICATION forming part of Letters Patent No. 349,753, dated September 28, 1886.

Application filed April 28, 1886. Serial No. 200,456. (No model.)

*To all whom it may concern:*

Be it known that I, RENALDO SOLANO, late of San Francisco, in the State of California, but now of Brooklyn, in the county of Kings and State of New York, have invented certain Improvements in Vacuum-Motors, of which the following is a specification.

This invention relates to that class of motors in which a to-and-fro or reciprocating movement is given to a piston through the agency of atmospheric pressure induced by the alternate withdrawal from and admission to of the atmosphere from behind the piston.

The object of my invention is to provide a motor of the class mentioned which will afford greater strength and durability, be capable of more easy repair, and more certain and effective in its operation than those heretofore in use.

My invention comprises certain novel combination of parts whereby these objects are effectually secured.

Figure 1 is a central longitudinal sectional view representing my said invention with the piston at the end of its outward stroke. Fig. 2 is a like view with the piston shown at the end of its inward stroke. Fig. 3 is a face or front view of the same.

A is the cylinder. On the front or forward periphery of it is a radial flange, *a*. At its opposite or near end is the passage *b*, which, by a suitable pipe or other means, is connected with any ordinary or suitable apparatus for alternately exhausting and supplying air to said cylinder. As such exhausting and supplying devices are well known, it is unnecessary to here describe the construction or operation thereof.

Provided in or to the cylinder A, and preferably integral therewith, are guides *c*.

B is the piston. This piston has its circumference adapted to move in easy contact during its stroke with the internal surface of the cylinder. There is a cylindrical flange, *f*, on this piston, which augments its circumferential bearing-surface in contact with the cylinder, as aforesaid, and also affords a seat for the inner edge of the flexible diaphragm-packing C, which consists of a web of leather, sheet india-rubber, or other flexible material practically impervious to the passage of air.

The office of this diaphragm-packing is to connect the piston to the cylinder in a practically air-tight manner, and thus pack the joint between the piston and the cylinder. The outer edge of this diaphragm-packing rests upon the flange *a* of the cylinder. A flat ring, D, is laid upon the said outer edge of the diaphragm-packing and the ring. The flange *a* and the circumferential outer part of the diaphragm-packing are snugly held together by the bolts *g*, the diaphragm-packing being tightly and securely held between said ring and flange, and thereby secured to the cylinder A. An annulus, E, is fitted upon the inner circumference of the diaphragm-packing within the flange *f* and bolted to said flange by bolts *h* with the contiguous inner circumferential portion of the diaphragm-packing clamped between said annulus *h* and flange *f*, thus securing the said diaphragm-packing to the piston. The piston has guide-rods *m*, which extend through the guides *c*, and the office of which is to assist in maintaining the piston in proper axial position within the cylinder. Within the cylinder, and preferably placed around the guide-rods *m*, are springs *n*, arranged to tend to move the piston forward or outward when said springs are permitted to act after compression. To the front or outer side of the piston is duly pivoted or otherwise attached a rod, F, or other device for transmitting motion from the piston. When air is exhausted from the cylinder A, the pressure of the outer atmosphere forces the piston inward. When air is readmitted to the cylinder, the piston is enabled to resume its place by the action of the springs *n*, or if air under more than atmospheric pressure is forced into the cylinder the piston will be moved outward with a force proportioned to the degree to which the internal pressure exceeds that of the atmosphere.

My said invention is especially adapted for use under conditions which imply the necessity of considerable power applied with a short piston-stroke; but my said invention may be used for various purposes independent of such conditions.

The apparatus may be very readily taken apart for repairs, examination, or the like.

I am aware that it has been proposed to transmit motion from a diaphragm fitted upon a suitable vessel and acted upon by the alternate exhaustion and supply of air to and from said vessel, said diaphragm being re-enforced near its center by an annular plate; but such construction and the operation therein are different from my said invention, which latter includes the use and operation of a piston working in contiguity to the inner surface of the cylinder and connected by a flexible web of any suitable material with the said cylinder in such manner as to pack the joint between the periphery of the piston and the concentric inner surface of the cylinder, and which web I term for convenience of designation a "diaphragm-packing."

It will be observed that by having the diaphragm-packing attached to the periphery of the piston the inward movement of the latter tends to bring the diaphragm-packing parallel, or substantially so, with the inner surface of the cylinder, so that the external air pressing in a laterally outward direction upon the packing-diaphragm tends to press the latter against the inner surface of the cylinder, and thus more effectually packs the piston against the ingress of air.

What I claim as my invention, is—

1. The combination of the cylinder A, having the flange $a$, the piston B, having the flange $f$, the diaphragm-packing C, and bolts $g$ and $h$, the whole arranged for joint use and operation substantially as and for the purpose herein set forth.

2. The combination of the cylinder A, the piston B, having its circumference contiguous to and coincident with the inner surface of the said cylinder, the diaphragm-packing C, connecting said piston with said cylinder, the guides $c$, and guide-rods $m$, substantially as and for the purpose herein set forth.

3. The combination of the cylinder A, piston B, having its circumference contiguous to and coincident with the inner surface of said cylinder, the diaphragm-packing C, connecting said cylinder and piston, the guides $c$, guide-rods $m$, and springs $n$, all substantially as and for the purpose herein set forth.

R. SOLANO.

Witnesses:
JOSIAH T. LOVEJOY,
CHARLES A. HERBERT.